(12) United States Patent
Hofmann et al.

(10) Patent No.: US 6,616,175 B2
(45) Date of Patent: Sep. 9, 2003

(54) GAS BAG RESTRAINT SYSTEM

(75) Inventors: Sven Hofmann, Schwäbisch Gmünd (DE); Dominique Acker, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/944,898

(22) Filed: Aug. 31, 2001

(65) Prior Publication Data

US 2002/0027349 A1 Mar. 7, 2002

(30) Foreign Application Priority Data

Sep. 1, 2000 (DE) ..................... 200 15 135 U

(51) Int. Cl.$^7$ .............................................. B60R 21/20
(52) U.S. Cl. ................... 280/728.3; 280/730.2
(58) Field of Search .................. 280/736, 742, 280/730.2, 732, 728.3, 728.1

(56) References Cited

U.S. PATENT DOCUMENTS

| | | | | |
|---|---|---|---|---|
| 4,878,689 A | * | 11/1989 | Mitzkus et al. | 280/728.3 |
| 4,911,471 A | | 3/1990 | Hirabayashi | |
| 5,209,510 A | | 5/1993 | Mamiya | |
| 5,238,264 A | | 8/1993 | Barnes | |
| 5,322,324 A | * | 6/1994 | Hansen et al. | 280/731 |
| 5,362,096 A | * | 11/1994 | Satoh et al. | 280/728.3 |
| 5,382,047 A | * | 1/1995 | Gajewski | 280/728.3 |
| 5,538,099 A | * | 7/1996 | Blackburn et al. | 280/730.2 |
| 5,738,367 A | * | 4/1998 | Zichichi et al. | 280/728.3 |
| 5,868,419 A | * | 2/1999 | Taguchi et al. | 280/728.3 |
| 6,012,735 A | * | 1/2000 | Gray et al. | 280/732 |
| 6,149,187 A | * | 11/2000 | Single et al. | 280/728.3 |
| 6,173,990 B1 | * | 1/2001 | Nakajima et al. | 280/730.2 |
| 6,231,072 B1 | | 5/2001 | Pywell et al. | |
| 6,390,497 B1 | * | 5/2002 | Shin | 280/732 |

FOREIGN PATENT DOCUMENTS

DE 3918281 A1 12/1990
DE 19846853 A1 4/2000

* cited by examiner

Primary Examiner—Eric Culbreth
(74) Attorney, Agent, or Firm—Tarolli, Sundheim, Covell & Tummino L.L.P.

(57) ABSTRACT

The invention relates to gas bag restraint system for use in motor vehicles, the system comprising a gas bag, a cover for the gas bag, a guiding sheet metal and a deployment opening for the gas bag. Upon deployment of the gas bag the cover is swiveled outwards to uncover the deployment opening. A guiding sheet metal is provided which forms at least part of the cover and is bent during swiveling. The guiding sheet metal exerts, in a position completely swiveled, a resistance to the gas bag when deploying so as to predetermine a deployment direction of the gas bag.

36 Claims, 2 Drawing Sheets

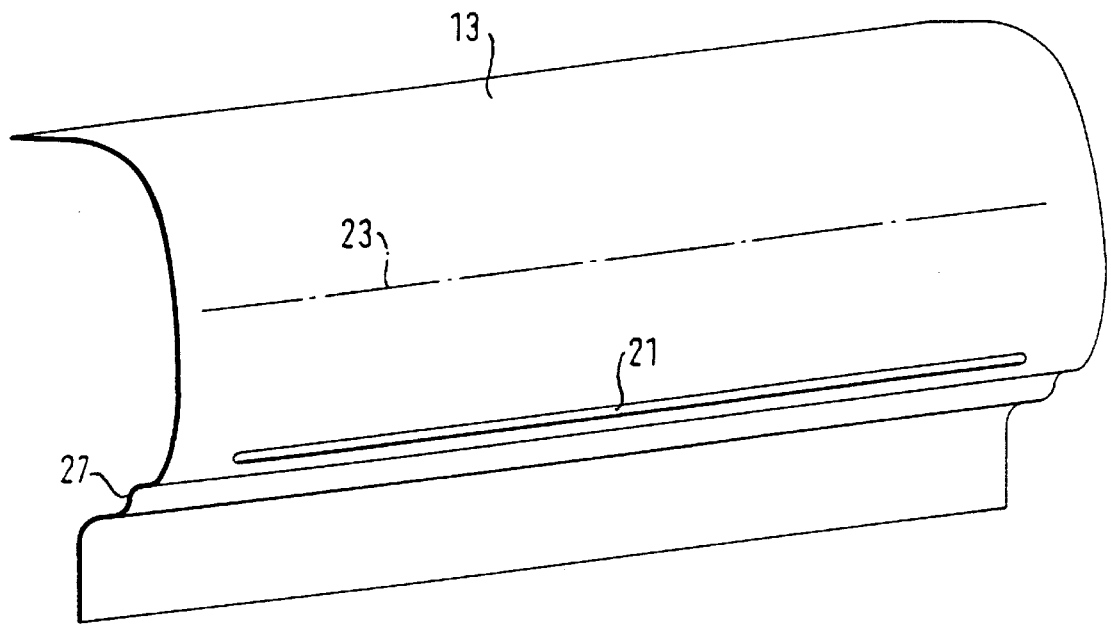
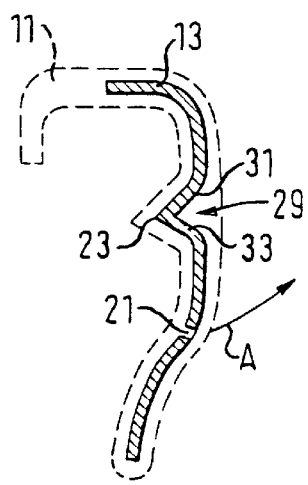
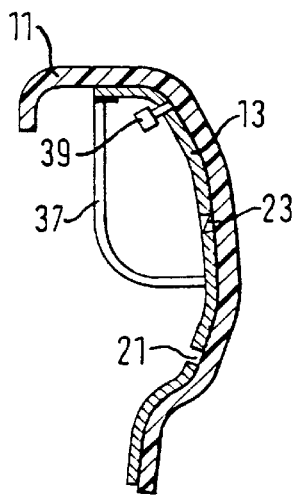

GAS BAG RESTRAINT SYSTEM

TECHNICAL FIELD

This invention relates to a gas bag restraint system comprising a gas bag and a cover for the gas bag.

BACKGROUND OF THE INVENTION

Upon deployment of the gas bag, the cover is torn open, so that the flap portion formed thereby can be pressed outwards by the gas bag. As a result of the pressure of the gas bag, the flap portion usually swivels completely open until it strikes against the cover, so as to exert an as slight a resistance as possible to the emerging gas bag.

BRIEF SUMMARY OF THE INVENTION

The invention provides a gas bag restraint system in which the cover, to be more precise the flap portion of the cover, positively influences the deployment of the gas bag in a predeterminable, desired way. This is achieved in a gas bag restraint system which comprises a gas bag, a cover for the gas bag, and a guiding sheet metal and a deployment opening for the gas bag. Upon deployment of the gas bag, the cover is swiveled to uncover the deployment opening. The guiding sheet metal forms at least part of the cover and is bent during swiveling. The guiding sheet metal exerts, in a position completely swiveled outwards, i.e. at the end of its opening process, a resistance to the gas bag when deploying so as to predetermine a deployment direction of the gas bag. The prior art cover is swiveled outwards to such an extent that during deployment, it no longer exerts a resistance to the deploying gas bag. It is intended that, by provision of the guiding sheet metal, the latter controls the deployment direction of the gas bag during the entire inflation process. The gas bag, during deployment, contacts the guiding sheet metal and, optionally, the remaining part of the cover. The cover may include a visible part adjoining the guiding sheet metal, e.g. an injection-molded part or a covered plastic foam part, which is visible from outside in the installed state of the restraint system and which likewise is swiveled or displaced on bending of the guiding sheet metal, in order to open the deployment opening for the gas bag. The visible part which is directly or indirectly connected with the guiding sheet metal, or adjoins thereto, usually influences the bending process, with the result that it also co-defines the end positions of guiding sheet metal and the whole cover, respectively, and also co-defines the deployment direction.

Preferably, the visible part is connected with the guiding sheet metal, and these parts form a unit. This connection can be effected in that the visible part, which usually consists of plastics, is applied onto the guiding sheet metal by injection-molding or the guiding sheet metal is encased in foam and the foam-encased region forms the visible part. Moreover, the visible part can also be bonded to the guiding sheet metal or be connected with the guiding sheet metal via welding pegs of plastics.

Preferably, the gas bag restraint system according to the invention comprises a gas bag module which is attached to the vehicle via the guiding sheet metal itself, so that the guiding sheet metal has a dual function.

In accordance with one embodiment, the guiding sheet metal has a predetermined swiveling axis, which is predetermined by a line of weakness in the material of the guiding sheet metal, e.g. by a perforation of the guiding sheet metal.

Beads in the guiding sheet metal can define rigid regions of the guiding sheet metal, which are not able to be bent.

In accordance with another embodiment, a limiting means is provided which limits the maximum swiveling angle of the guiding sheet metal, so that the deployment process can be predetermined within close limits.

The limiting means can for instance be achieved by a bead at the guiding sheet metal, which bead has portions which collide when a predetermined maximum swiveling angle is reached.

Other possibilities for forming the limiting means consist in providing a tether, or in stops mounted on the guiding sheet metal.

The restraint system according to the invention may be integrated into a vehicle side door or a vehicle seat or may be a window-bag system with a curtain-like gas bag covering the side windows of the vehicle.

BRIEF DESCRIPTION OF THE DRAWINGS

FIG. 2 shows a guiding sheet metal for controlling the gas bag deployment, which is provided in the gas bag restraint system as shown in FIG. 1, FIG. 3 is a cross-sectional view of a cover with a guiding sheet metal in accordance with another embodiment, and FIG. 4 is a cross-sectional view of a cover with a guiding sheet metal in accordance with still another embodiment.

DETAILED DESCRIPTION OF THE PREFERRED EMBODIMENTS

Figure 1:
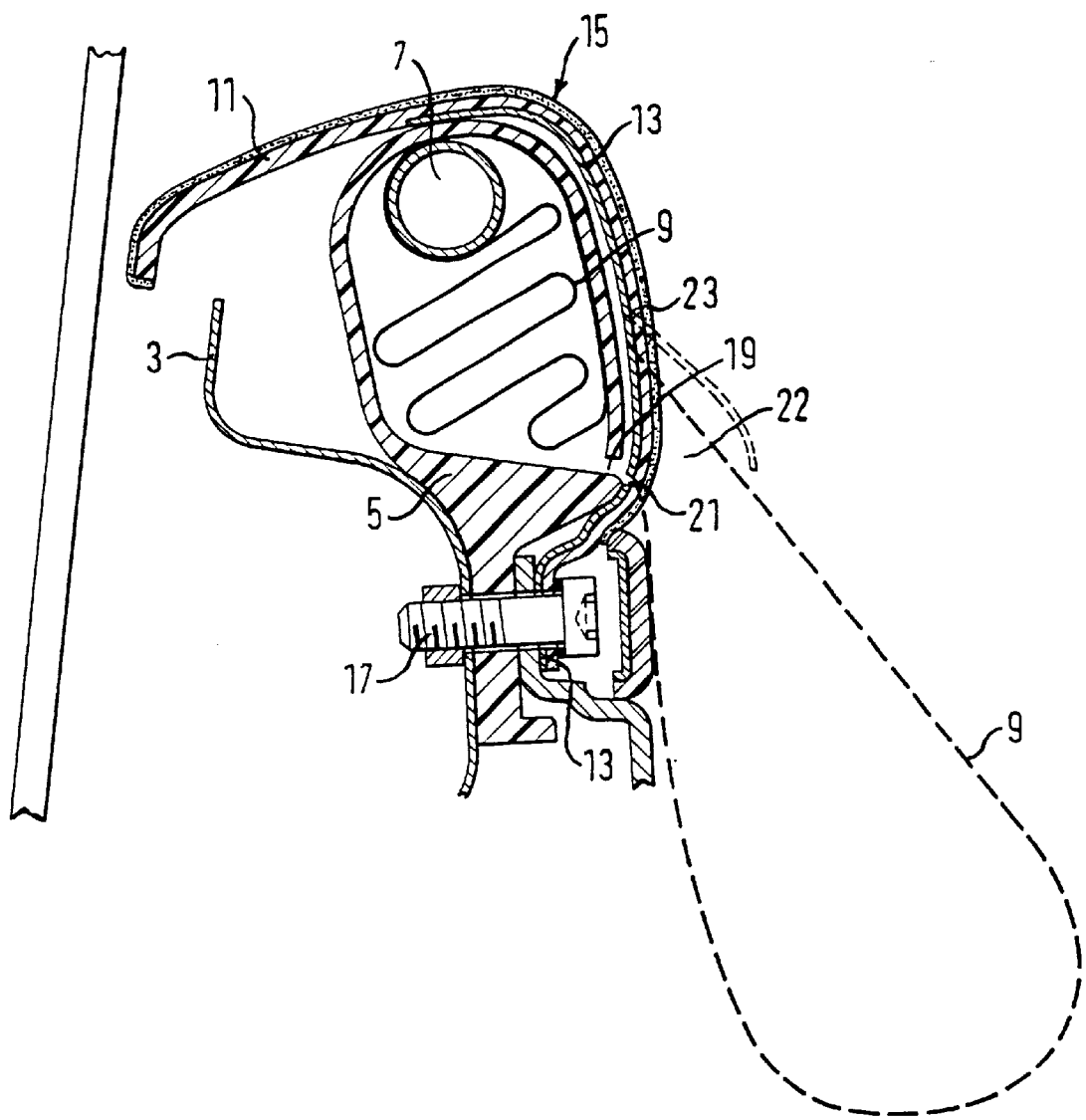
FIG. 1 is a cross-sectional view of a gas bag restraint system according to the invention, which is accommodated in a vehicle door.

FIG. 1 represents a door-integrated side gas bag restraint system, which is screwed to the door inner panel 3 of the vehicle door. A gas bag module has a plastic container 5 in which a gas generator 7 and a folded gas bag 9 are accommodated. A cover surrounds the container, so that the entire gas bag module cannot be seen from the outside. The cover consists of a guiding sheet metal 13 as well as of a visible part 11 made of plastics and applied onto the guiding sheet metal by injection-molding or bonding, which visible part forms a unit with the guiding sheet metal 13. The guiding sheet metal 13 which forms sections of the cover extends downwards from the upper end 15 of the cover to below the screw attachment 17. In the region of an opening slot 19 of the container 5, the guiding sheet metal 13 has a continuous slot 21 for forming a tear line, which slot can be better seen in FIG. 2.

In the case of a side impact, the gas generator 7 inflates the gas bag 9. The latter urges apart the container 5, so that the opening slot 19 becomes larger. Moreover, the visible part 11 is torn open along the slot 21 and is bent upwards about a swiveling axis 23, which is represented in broken lines. The part of the cover which has been swiveled outwards now uncovers a deployment opening 22 for the deploying gas bag. The cover swiveled to the outside, to be more precise that part of the cover from the slot 21 up to the swiveling axis 23, controls the deployment direction of the gas bag during the entire process of inflation and deployment. Since the cover does not swivel outwards by 180°, but due to the integrated guiding sheet metal 13 remains oriented obliquely downwards, as is shown in broken lines, the visible part 11 and the guiding sheet metal 13 direct the gas bag downwards at an angle in that the gas bag, on unfolding, moves obliquely downwards along the cover.

In FIG. 2 there can be seen that the guiding sheet metal has several beads 27 below the slot 21, in order to define a stable region which cannot be bent.

Preferably, limiting means are provided which limit the maximum swiveling angle of the guiding sheet metal 13 together with the visible part 11.

As limiting means, there may for instance be provided a V-shaped bead 29 with opposing portions 31, 33, which collide when the cover swivels open in the direction of the arrow A, and thus define the swiveling angle (FIG. 3).

In the embodiment in accordance with FIG. 4 a tether 37 is provided as limiting means, which tether is attached to the swiveling portion of the guiding sheet metal 13 and to a non-swiveling portion thereof. The swiveling axis 23 is predetermined by lines of weakness in the material, which lines may have slots.

Another possibility is to mount fittings on the guiding sheet metal 13.

The attachment of the visible part 11 to the guiding sheet metal 13 may, where appropriate, also be effected by encasing the guiding sheet metal with foam, as is indicated in FIG. 3 by broken lines. Moreover, so-called welding pegs 39 of plastics, which protrude through openings in the guiding sheet metal, may create a connection between the visible part 11 and the guiding sheet metal 13 (cf. FIG. 4).

The visible part 11 and the guiding sheet metal 13 not necessarily have to be firmly connected with each other; the visible part 11 can be arranged, for instance, so as to merely adjoin the guiding sheet metal 13 and can be pushed aside by the guiding sheet metal 13 when the latter swivels open.

What is claimed is:

1. A gas bag restraint system for use in motor vehicles, said system comprising a gas bag, a cover for said gas bag, a guiding sheet metal and a deployment opening for said gas bag, which cover upon deployment of said gas bag is swiveled to uncover said deployment opening, said guiding sheet metal forming at least part of said cover and being bent during swiveling and exerting, in a position completely swiveled, a resistance to said gas bag when deploying so as to determine a deployment direction of said gas bag, a limiting means being integrated in said system which limiting means defines a maximum swiveling angle of said guiding sheet metal, said limiting means being a V-shaped bead in said guiding sheet metal, said bead having opposite portions which collide at said maximum swivel angle.

2. The gas bag restraint system as claimed in claim 1, wherein said system is one of a vehicle side door and vehicle seat integrated system.

3. The gas bag restraint system as claimed in claim 1 wherein said cover has a visible part adjoining said guiding sheet metal.

4. The gas bag restraint system as claimed in claim 3, wherein said visible part is connected with said guiding sheet metal.

5. The gas bag restraint system as claimed in claim 4, wherein said visible part is applied onto said guiding sheet metal by injection-molding.

6. The gas bag restraint system as claimed in claim 4, wherein said guiding sheet metal is provided with a foam casing which forms said visible part.

7. The gas bag restraint system as claimed in claim 4, wherein said visible part is bonded to said guiding sheet metal.

8. The gas bag restraint system as claimed in claim 4, wherein a welding peg made of plastics is provided, by means of which said visible part is connected with said guiding sheet metal.

9. The gas bag restraint system as claimed in claim 1, wherein a gas bag module is provided which is attached to said motor vehicle via said guiding sheet metal.

10. The gas bag restraint system as claimed in claim 1, wherein said guiding sheet metal has a predetermined swiveling axis, which is formed by a line of weakness in a material of said guiding sheet metal.

11. The gas bag restraint system as claimed in claim 1, wherein said guiding sheet metal has at least one bead which defines a region that cannot be bent when said cover is opened.

12. The gas bag restraint system as claimed in claim 1, wherein said guiding sheet metal has at least one slot which defines a tear line of said guiding sheet metal, along which tear line said guiding sheet metal tears open when said cover is opened.

13. A gas bag restraint system for use in motor vehicles, said system comprising a gas bag, a cover for said gas bag, a guiding sheet metal and a deployment opening for said gas bag, which cover upon deployment of said gas bag is swiveled to uncover said deployment opening, said guiding sheet metal forming at least part of said cover and being bent during swiveling and exerting, in a position completely swiveled, a resistance to said gas bag when deploying so as to determine a deployment direction of said gas bag, a limiting means being integrated in said system which limiting means defines a maximum swiveling angle of said guiding sheet metal, said limiting means being a V-shaped bead in said guiding sheet metal, said bead having converging outer surfaces, one of the surfaces pivoting relative to the other of the surfaces to engage each other, the engagement defining said maximum swivel angle.

14. The gas bag restraint system as claimed in claim 13, wherein said system is one of a vehicle side door and vehicle seat integrated system.

15. The gas bag restraint system as claimed in claim 13, wherein said cover has a visible part adjoining said guiding sheet metal.

16. The gas bag restraint system as claimed in claim 13, wherein said visible part is connected with said guiding sheet metal.

17. The gas bag restraint system as claimed in claim 16, wherein said visible part is applied onto said guiding sheet metal by injection-molding.

18. The gas bag restraint system as claimed in claim 16, wherein said guiding sheet metal is provided with a foam casing which forms said visible part.

19. The gas bag restraint system as claimed in claim 16, wherein said visible part is bonded to said guiding sheet metal.

20. The gas bag restraint system as claimed in claim 16, wherein a welding peg made of plastics is provided, by means of which said visible part is connected with said guiding sheet metal.

21. The gas bag restraint system as claimed in claim 13, wherein a gas bag module is provided which is attached to said motor vehicle via said guiding sheet metal.

22. The gas bag restraint system as claimed in claim 13, wherein said guiding sheet metal has a predetermined swiveling axis, which is formed by a line of weakness in a material of said guiding sheet metal.

23. The gas bag restraint system as claimed in claim 13, wherein said guiding sheet metal has at least one bead which defines a region that cannot be bent when said cover is opened.

24. The gas bag restraint system as claimed in claim 13, wherein said guiding sheet metal has at least one slot which defines a tear line of said guiding sheet metal, along which tear line said guiding sheet metal tears open when said cover is opened.

25. A gas bag restraint system for use in motor vehicles, said system comprising a gas bag, a cover for said gas bag, a guiding sheet metal and a deployment opening for said gas bag, which cover upon deployment of said gas bag is swiveled to uncover said deployment opening, said guiding sheet metal forming at least part of said cover and a portion of said guiding sheet metal being bent about a line at a location intermediate terminal edges of said guiding sheet metal during swiveling, said guiding sheet metal exerting, in a position completely swiveled, a resistance to said gas bag when deploying so as to determine a deployment direction of said gas bag, a limiting means being integrated in said system which limiting means defines a maximum swiveling angle of said guiding sheet metal, said limiting means being a bead in said guiding sheet metal, portions of said guiding sheet metal colliding when a predetermined swiveling angle is reached.

26. The gas bag restraint system as claimed in claim 25, wherein said system is one of a vehicle side door and vehicle seat integrated system.

27. The gas bag restraint system as claimed in claim 25, wherein said cover has a visible part adjoining said guiding sheet metal.

28. The gas bag restraint system as claimed in claim 27, wherein said visible part is connected with said guiding sheet metal.

29. The gas bag restraint system as claimed in claim 28, wherein said visible part is applied onto said guiding sheet metal by injection-molding.

30. The gas bag restraint system as claimed in claim 28, wherein said guiding sheet metal is provided with a foam casing which forms said visible part.

31. The gas bag restraint system as claimed in claim 28, wherein said visible part is bonded to said guiding sheet metal.

32. The gas bag restraint system as claimed in claim 28, wherein a welding peg made of plastics is provided, by means of which said visible part is connected with said guiding sheet metal.

33. The gas bag restraint system as claimed in claim 25, wherein a gas bag module is provided which is attached to said motor vehicle via said guiding sheet metal.

34. The gas bag restraint system as claimed in claim 25, wherein said guiding sheet metal has a predetermined swiveling axis, which is formed by a line of weakness in a material of said guiding sheet metal.

35. The gas bag restraint system as claimed in claim 25, wherein said guiding sheet metal has at least one bead which defines a region that cannot be bent when said cover is opened.

36. The gas bag restraint system as claimed in claim 25, wherein said guiding sheet metal has at least one slot which defines a tear line of said guiding sheet metal along which tear line said guiding sheet metal tears open when said cover is opened.

* * * * *

UNITED STATES PATENT AND TRADEMARK OFFICE
CERTIFICATE OF CORRECTION

PATENT NO.     : 6,616,175 B2                                        Page 1 of 1
DATED          : September 9, 2003
INVENTOR(S)    : Sven Hofmann and Dominique Acker It is certified that error appears in the above-identified patent and that said Letters Patent is hereby corrected as shown below:

Column 4,
Line 39, after "claim" change "13" to -- 15 --.

Signed and Sealed this

Fourth Day of May, 2004

JON W. DUDAS
*Acting Director of the United States Patent and Trademark Office*